United States Patent
Yoneda et al.

(10) Patent No.: US 9,854,062 B2
(45) Date of Patent: Dec. 26, 2017

(54) DATA RELAY APPARATUS AND METHOD, SERVER APPARATUS, AND DATA SENDING METHOD

(71) Applicant: Panasonic Intellectual Property Management Co., Ltd., Osaka (JP)

(72) Inventors: Takahiro Yoneda, Osaka (JP); Eiichi Muramoto, Kanagawa (JP); Ryota Ohnishi, Osaka (JP); Kazunobu Konishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 486 days.

(21) Appl. No.: 14/558,757

(22) Filed: Dec. 3, 2014

(65) Prior Publication Data

US 2015/0172413 A1    Jun. 18, 2015

(30) Foreign Application Priority Data

Dec. 18, 2013    (JP) .................................. 2013-261877

(51) Int. Cl.
G06F 15/16    (2006.01)
H04L 29/08    (2006.01)

(52) U.S. Cl.
CPC .................................. *H04L 67/327* (2013.01)

(58) Field of Classification Search
None
See application file for complete search history.

(56) References Cited

U.S. PATENT DOCUMENTS

| 2012/0317616 | A1 | 12/2012 | Kim | |
| 2013/0166625 | A1* | 6/2013 | Swaminathan | H04N 21/64738 709/203 |
| 2014/0032777 | A1* | 1/2014 | Yuan | H04L 67/26 709/231 |
| 2014/0304361 | A1* | 10/2014 | Chauhan | H04L 67/1097 709/216 |
| 2015/0019708 | A1* | 1/2015 | Denis | H04L 43/04 709/224 |
| 2016/0226782 | A1* | 8/2016 | Schneider | H04L 67/2833 |

OTHER PUBLICATIONS

Van Jacobson, et al., "Networking Named Content" ACM CoNEXT, 2009.

(Continued)

*Primary Examiner* — Bryan Lee
*Assistant Examiner* — Oluwatosin Gidado
(74) *Attorney, Agent, or Firm* — Greenblum & Bernstein, P.L.C.

(57) ABSTRACT

A relay node includes interfaces, a request statistical table that stores therein information concerning a request in an entry generated for each chunk, a request statistics processor that records a reception time and sending source information concerning a request in the request statistical table, a target request determining unit that determines whether or not a currently received request is a target request, a delay amount determining unit that determines a delay amount for a received request, which is a target request, and a delay processing unit that delays forwarding a received request or content data for a delay amount.

13 Claims, 17 Drawing Sheets

(56) References Cited

OTHER PUBLICATIONS

Giovanna Carofiglio, et al., "ICP : Design and evaluation of an interest control protocol for content-centric Networking" IEEE INFOCOM 2012.
Giovanna Carofiglio, et al., "Multipath congestion control in content-centric networks" IEEE INFOCOM 2013. Internet<URL:http://infocom.di.unimi.it/index.php/nomenprogram.html>.
Stefano Salsano, et al., "Transport-layer issues in information centric networks" ACM 2012.
Somaya Arianfar, et al., "ConTug: A receiver-driven transport protocol for content-centric networks" IEEE ICNP, 2010 Internet<URLhttp://www.techrepublic.com/resource-library/whitepapers/contug-a-receiver-driven-transport-protocol-for-content-centric-networks/>.

* cited by examiner

FIG. 1A

/abc.com/videos/xxx.mpg/<timestamp>/<sequence no>
101

FIG. 1B

| Content Name |
| Selector (order preference, publisher filter, scope, ...) |
| Nonce |

| Content Name |
| Signature (digest algorithm, witness, ...) |
| Signed Info (publisher ID, key locator, stale time, ...) |
| Data |

103

DATA RELAY APPARATUS AND METHOD, SERVER APPARATUS, AND DATA SENDING METHOD

BACKGROUND

1. Technical Field

The present disclosure relates to a data relay apparatus that receives a request for content data, transfers such a request to a server apparatus, and transfers content data sent from the server apparatus in response to such a request in information centric networking (ICN). The disclosure also relates to such a server apparatus, a data relay method, and a data sending method.

2. Description of the Related Art

Lately, a technology referred to as ICN for obtaining content data by specifying, not a location at which the content data is disposed, but a name of the content data itself has been proposed. A typical example of ICN is content centric networking (CCN) disclosed in the following literature: U.S. Patent No. 2012/0317616; Van Jacobson, Diana K. Smetters, James D. Thornton, Michael F. Plassi, Nicholas H. Briggs, and Rebecca L. Braynard. Networking Named Content. ACM CoNEXT, 2009; Giovanna Carofiglio, Massimo Gallo, and Luca Muscariello. Icp: Design and evaluation of an interest control protocol for content-centric networking. INFOCOM NOMEN Workshop, 2012; Giovanna Carofiglio, Massimo Gallo, Luca Muscariello, and Michele Papalini. Multipath congestion control in content-centric networks. INFOCOM NOMEN Workshop, 2013; Stefano Salsano, Andrea Detti, Matteo Cancellier, Matteo Pomposini, and Nicola Blefari-Melazzi. Transport-layer issues in information centric networks. ACM SIGCOMM ICN Workshop, 2012; and Somaya Arianfar, Pekka Nikander, Lars Eggert, Jorg Ott, and Walter Wong. Contug: A receiver-driven transport protocol for content centric networks. IEEE ICNP, 2010.

In this technology (ICN), in order to obtain content data, a user terminal apparatus sends a request packet that specifies, not a location at which the content data is disposed, but a name of the content data itself, to a network. Then, upon receiving the request packet, a content providing apparatus (server apparatus) sends a data packet of the content data corresponding to the name of the content data.

A relay node that relays data serves to forward a request packet to a content providing apparatus and to forward a data packet to a user terminal apparatus in accordance with a routing table. The relay node also serves to concentrate the traffic by using a pending interest table (PIT) and a content store (CS). In CCN, by utilizing these mechanisms, when multiple users attempt to obtain the same piece of content, data is distributed by making the best use of a cache in a network.

SUMMARY

In the above-described technology, however, more efficient data distribution by reducing the traffic of the entire network is demanded.

Accordingly, it is an object of the present disclosure to provide a data relay apparatus and method, a server apparatus, and a data sending method that implement more efficient data distribution by reducing the traffic of the entire network.

In one general aspect, the techniques disclosed here feature a data relay apparatus in information centric networking (ICN) comprising: communication circuitry that receives a request corresponding to a chunk divided from content data, the chunk being a predetermined unit of the content data, forwards the received request, receives the content data in response to the received request, and forwards the received content data; a request statistical table that stores therein information concerning the received request in an entry generated for each chunk corresponding to each request; and control circuitry, which in operation: records a reception time and sending source information concerning the received request as the information in the entry generated in the request statistical table; determines that the received request is a target request, by referring to the request statistical table, if the request statistical table includes an entry for a previous chunk positioned previous to a chunk corresponding to the received request in an arrangement order of chunks forming the content data and if requests corresponding to the previous chunk have been received from a plurality of different sending sources for a predetermined time; determines a delay amount for the received request if the received request is determined to be the target request; and delays forwarding the received request for the delay amount.

These general and specific aspects may be implemented by using a system, a method, and a computer program, and any combination of systems, methods, and computer programs.

According to the present disclosure, it is possible to implement more efficient data distribution by reducing the traffic of the entire network.

BRIEF DESCRIPTION OF THE DRAWINGS

FIG. 1A illustrates an example of a name used in CCN;

FIG. 1B illustrates an example of the format configuration of an interest message used in CCN;

FIG. 1C illustrates an example of the format configuration of a content message used in CCN;

DETAILED DESCRIPTION

Findings Based on the Disclosure

The inventors of this disclosure have found that the following problem has been presented concerning ICN (a typical example of CCN).

Figure 2:
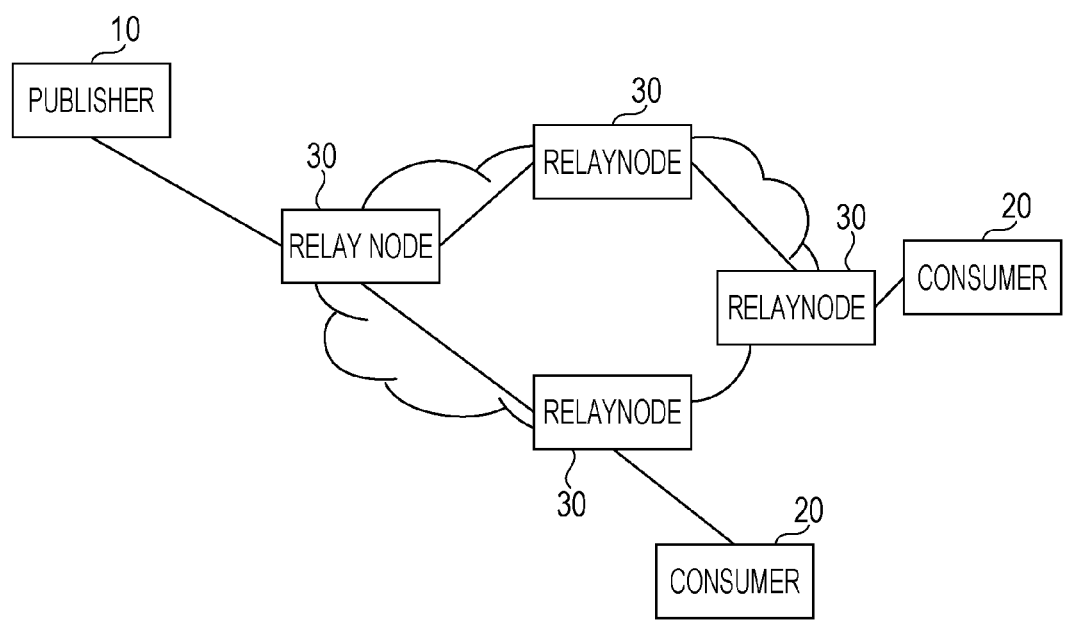
FIG. 2 illustrates an example of the configuration of a network using CCN.

A description will first be given of CCN on the basis of the terminology described in CCN. FIG. 1A illustrates an example of a name 101 used in CCN. FIG. 1B illustrates an example of the format configuration of an interest message 102. FIG. 1C illustrates an example of the format configuration of a content message 103. FIG. 2 illustrates an example of the configuration of a network using CCN.

In CCN, communication is performed on the basis of, for example, the name 101 shown in FIG. 1A which is linked with content data. Generally, in CCN, there are three node types and two message types. Nodes are divided into three types, as shown in FIG. 2, that is, a publisher (server apparatus) 10 that generates and distributes content data, a consumer (terminal apparatus) 20 that makes a request for content data, and a relay node (data relay apparatus) 30 that relays a message. Then, these nodes perform communication in the following manner by using two messages, that is, the interest message 102 shown in FIG. 1B for making a request for content data and the content message 103 shown in FIG. 1C for sending content data.

The consumer 20 describes the name of content data to be obtained in the interest message 102 and sends it to a network.

The relay node 30 has routing information which is provided in the units of names or name spaces, which is called forwarding information base (FIB), and forwards an interest message to the publisher 10. The relay node 30 also has a pending interest table (PIT), and retains a name described in an interest message and interface information concerning an interface from which the interest message has been received until the relay node 30 receives and forwards a content message corresponding to the name. If the relay node 30 receives an interest message describing the same name as that retained in the PIT, it adds interface information concerning the received interest message to the PIT and does not forward this interest message.

Upon receiving an interest message describing a name, the publisher 10 sends a content message corresponding to the name.

Upon receiving a content message, the relay node 30 forwards the content message to an interface described in the PIT, thereby delivering the content message to the consumer 20 that has sent the interest message. In this case, the content message is temporarily cached in a region called a content store in association with the name of the content data. If the relay node 30 receives an interest message which makes a request for the content having this name while this content message is cached, it extracts the content message from the content store and sends it to an interface that has sent the interest message without forwarding the interest message to the publisher 10.

As described above, by performing communication on the basis of the name of each item of content data and by utilizing mechanisms, such as a PIT and a content store, the scalability that can handle a large volume of access to the same content data is provided.

Generally, in CCN, a large size of content data is divided into content data items by using a unit called a chunk or a segment, and by using a name linked with a chunk or a unit further divided from a chunk, the consumer 20 makes a request for content. Hereinafter, a chunk or a segment divided from content data and a unit further divided from a chunk will be all referred to as a "chunk".

It is difficult, however, to cache the same item of content data for a long time in a memory space used in the content store in the relay node 30, since new items of content data received by the relay node 30 have to be sequentially cached. This will be discussed below more specifically. After the memory space of the content store in the relay node 30 has become full, a certain item of content data or a content message divided as a chunk (hereinafter referred to as "data") may be cached out of the content store. In this case, if an interest message for making a request for this data (hereinafter referred to as a "request") has reached the relay node 30, this request is forwarded to the publisher 10 and the data is resent from the publisher 10 or an upstream relay node 30.

In the above-described case, by resending the data by the publisher 10 or an upstream relay node 30, the network bandwidth is consumed. Additionally, if a new item of data reaches the relay node 30 in which the memory space of the content store has become full, an older item of data is cached out of the content store in order to cache this new item of data in the content store.

Figure 3:
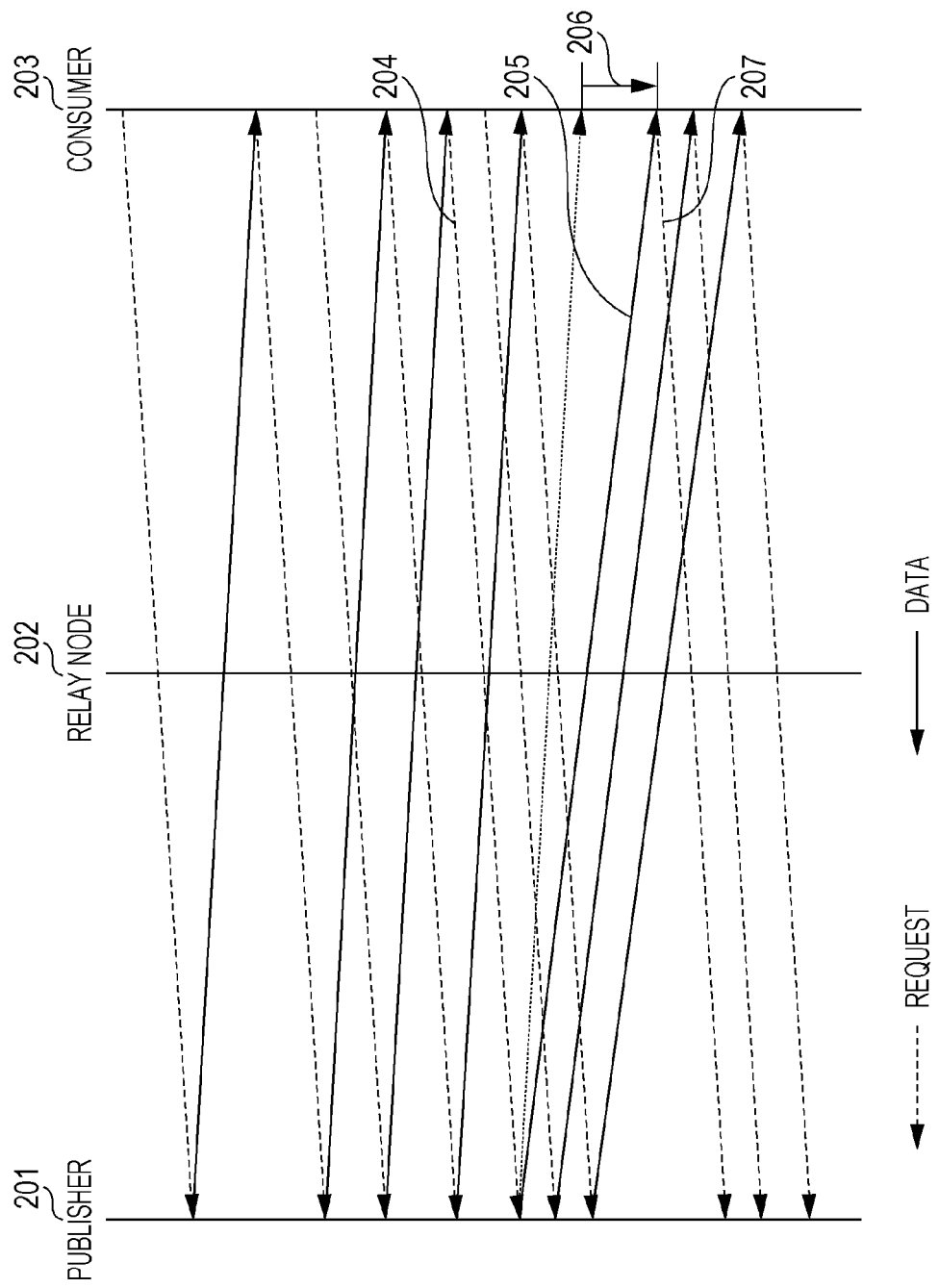
FIG. 3 is a sequence diagram illustrating how a delay in the arrival of data influences a request sending timing in CCN.

FIG. 3 is a sequence diagram illustrating how a delay in the arrival of data influences a request sending timing in CCN.

In a general data sending method in CCN, such as that disclosed in the above-described non-patent literature, as shown in FIG. 3, when a consumer 203 attempts to obtain a relatively large size of content data stored in a publisher 201 via a relay node 202, the consumer 203 sends multiple requests for content data items divided in units of chunks. In this case, if a delay 206 occurs in data reception 205 in response to request sending 204, in order to avoid the occurrence of network congestion, new request sending 207 is suspended until the data reception 205 has been completed.

Additionally, if the relay node 202 or the publisher 201 receives a request for a chunk divided from a certain item of content from multiple consumers 203, it is likely that the relay node 202 or the publisher 201 will receive requests for a series of chunks subsequent to the above-described chunk for this item of content data from the multiple consumers 203.

In order to solve the above-described demand, the present disclosure utilizes the above-described two operations.

A data relay apparatus according to one aspect of the present disclosure in information centric networking (ICN) includes: communication circuitry that receives a request corresponding to a chunk divided from content data, the chunk being a predetermined unit of the content data, forwards the received request, receives the content data in response to the received request, and forwards the received content data; a request statistical table that stores therein information concerning the received request in an entry generated for each chunk corresponding to each request; and control circuitry, which in operation: records a reception time and sending source information concerning the received request as the information in the entry generated in the request statistical table; determines that the received request is a target request, by referring to the request statistical table, if the request statistical table includes an entry for a previous chunk positioned previous to a chunk corresponding to the received request in an arrangement order of chunks forming the content data and if requests corresponding to the previous chunk have been received from a plurality of different sending sources for a predetermined time; determines a delay amount for the received request if the received request is determined to be the target request; and delays forwarding the received request for the delay amount.

With this arrangement, the arrival of multiple requests for the same chunk at the data relay apparatus is localized on the time axis. This makes it possible to further promote the traffic aggregation by using a mechanism, such as a content storage device or a PIT, used in CCN, thereby reducing the traffic of the entire network. The efficiency in utilizing a memory region of a content storage device of the data relay apparatus is also increased. Additionally, due to the efficient and effective function of a content storage device or a PIT of the data relay apparatus, the number of times a publisher has to send data in response to requests is decreased, thereby reducing the processing load on the publisher.

The data relay apparatus may further include: a storage device that temporarily stores the received chunk. In this case the control circuitry may not forward the received request if the chunk corresponding to the received request is stored in the storage device, may forward the chunk stored in the storage device in response to the received request if the chunk corresponding to the received request is stored in the storage device, and may delay forwarding the chunk stored in the storage device for the delay amount.

With this arrangement, forwarding of content data stored in the storage device is also delayed, thereby making it possible to efficiently localize on the time axis the arrival of multiple requests for the same chunk at the data relay apparatus.

The control circuitry may delete an entry generated for a chunk corresponding to preliminary received request in the request statistical table if a new request corresponding to the chunk is not received for a predetermined time interval or longer. With this arrangement, an unnecessary entry is deleted.

The control circuitry may identify a previous chunk by using a time stamp or a sequence number included in a name described in the received request.

With this arrangement, in the case of CCN, a previous chunk may be identified, thereby making it possible to determine whether or not a received request is a target request.

The control circuitry may identify a previous chunk positioned prior to the chunk of the received request by using a content identifier and a chunk number included in a name described in the request.

With this arrangement, in the case of an architecture different from CCN, for example, CONET, a previous chunk may be identified, thereby making it possible to determine whether or not a received request is a target request.

The delay amount determining unit may determine the delay amount by using at least one of: an order of arrival of received requests for the same chunk, the requests being transmitted from a plurality of sending sources; a time difference between a reception times of the received requests for the same chunk, the requests being transmitted from different sending sources; a time or the number of requests received for the previous chunk; a time from which a received request is forwarded until the chunk corresponding to the received request is arrived or a time from which a previous request corresponding to the previous chunk is forwarded until the previous chunk corresponding to the previous request is arrived; a processing load on the data relay apparatus; traffic sent and received by the data relay apparatus; and the type of content data or application.

With this arrangement, it is possible to determine a suitable delay amount for a target request.

A server apparatus according to another aspect of the present disclosure in ICN includes: communication circuitry that receives a request corresponding to a chunk divided from content data, the chunk being a predetermined unit, and sends the content data in response to the received request; a request statistical table that stores therein information concerning the received request in an entry generated for each chunk corresponding to each request; and control circuitry, which in operation: records a reception time and sending source information concerning the received request as the information in the entry generated in the request statistical table; determines that the received request is a target request, by referring to the request statistical table, if the request statistical table includes an entry for a previous chunk positioned prior to a chunk corresponding to the received request in an arrangement order of chunks forming the content data and if requests corresponding to the previous chunk have been received from a plurality of different sending sources for a predetermined time; determines a delay amount for the received request if the received request is determined to be the target request; and delays sending the content data in response to the received request for the delay amount.

With this arrangement, the arrival of multiple requests for the same chunk at the server apparatus is localized on the time axis. This makes it possible to further promote the traffic aggregation by using a mechanism, such as a content storage device or a PIT, used in CCN, thereby reducing the traffic of the entire network. Additionally, the number of times a publisher has to send data in response to requests is decreased, thereby reducing the processing load on the publisher.

These general and specific aspects may be implemented by using a system, a method, an integrated circuit, a computer program, or a computer-readable recording medium, such as a compact disc-read only memory (CD-ROM), or may be implemented by any combination of a system, a method, an integrated circuit, a computer program, and a computer-readable recording medium.

Embodiments of the present disclosure will be described below with reference to the accompanying drawings.

All of embodiments described below illustrate general or specific examples. Numeric values, configurations, materials, components, the arrangement positions and connection modes of the components, steps, and the order of steps illustrated in the following embodiments are only examples, and do not intend to limit the present disclosure. Among the components illustrated in the following embodiments, components that are not recited in the independent claims describing the most generic concept will be described as optional components.

Embodiment 1

Figure 4:
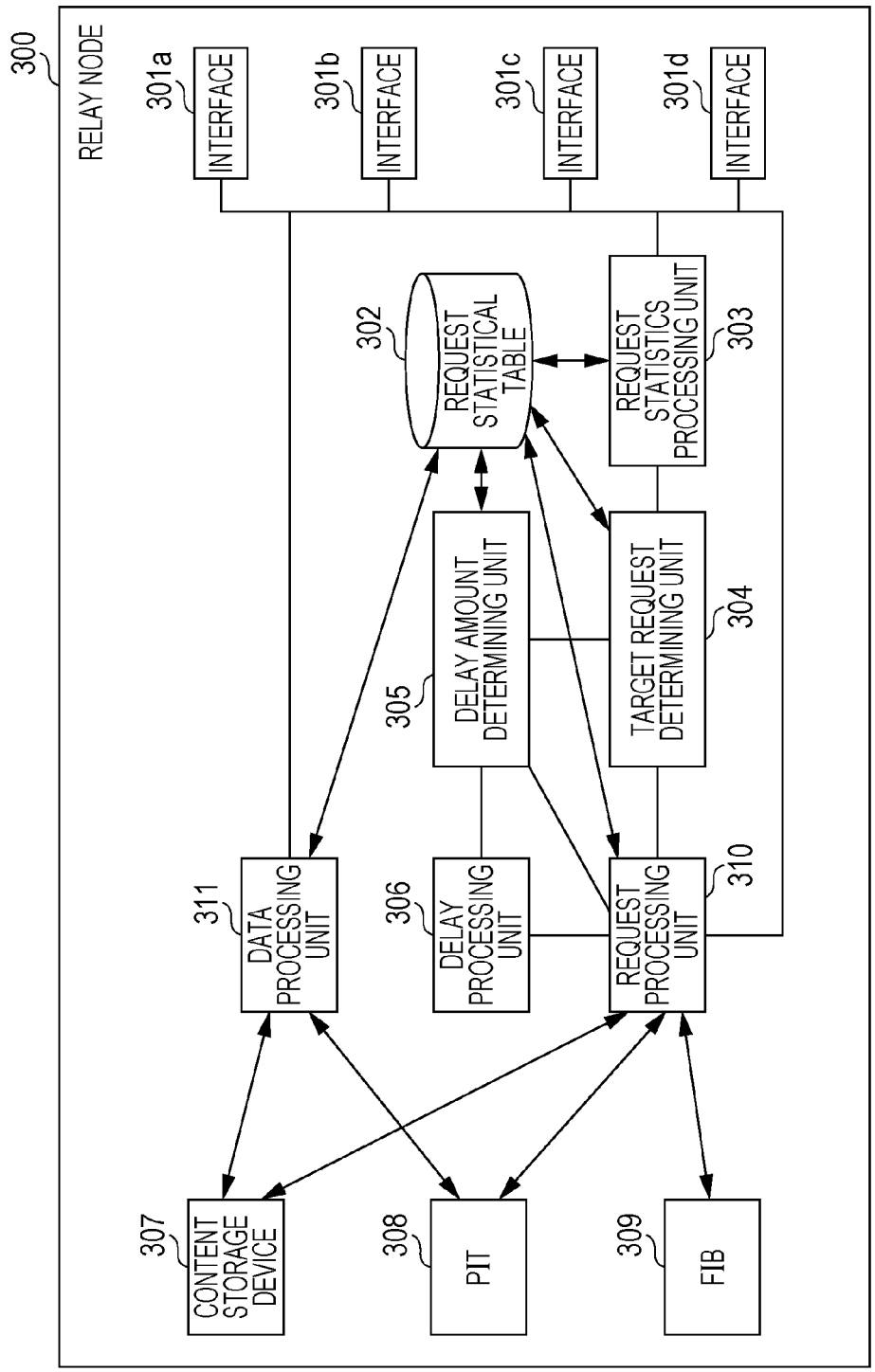
FIG. 4 is a block diagram illustrating an example of the configuration of a relay node according to Embodiment 1.

FIG. 4 is a block diagram illustrating an example of the configuration of a relay node 300 according to Embodiment 1.

The relay node 300 is a data relay apparatus that performs an operation in ICN, that is, receiving a request for each of chunks divided from content data, forwards the received request, receives content data corresponding to the request, and forwards the received content data. The relay node 300 includes, as shown in FIG. 4, four interfaces 301 (301a through 301d), a request statistical table 302, a request statistics processing unit 303, a target request determining unit 304, a delay amount determining unit 305, a delay processing unit 306, a content storage device 307, a pending interest table (PIT) 308, a forwarding information base (FIB) 309, a request processing unit 310, and a data processing unit 311. Although in this embodiment four interfaces 301 are provided, the number of interfaces 301 is not restricted as long as at least two interfaces 301 are provided. The interfaces 301a through 301d will be collectively referred to as the interface 301 unless it is necessary to distinguish between them.

The interface 301 is a communication unit that sends and receives requests and items of content data corresponding to the requests, and is connected to another relay node, a consumer, which is a terminal apparatus, or a publisher, which is a server apparatus.

The request statistical table 302 is a table in which items of information concerning requests received by the interface 301 are stored in entries generated in units of chunks.

Upon receiving a request for a chunk by the interface 301, the request statistics processing unit 303 performs request statistics processing. More specifically, the request statistics processing unit 303 records a reception time and sending source information concerning a received request in an entry of the associated chunk in the request statistical table 302. The request statistics processing unit 303 also deletes an entry for a chunk for which a new request is not received for a predetermined time interval or longer.

The target request determining unit 304 performs target request determining processing. More specifically, the target request determining unit 304 refers to the request statistical table 302 and performs the following determination. It is now assumed that a request for a chunk divided from a certain item of content is received (such a request will be referred to as a "received request"). In this case, if, among a plurality of chunks forming the item of content including the chunk corresponding to the received request, there is an entry for a chunk positioned prior to the chunk corresponding to the received request in a sequence or configuration order (hereinafter such a chunk will be referred to as a "previous chunk"), and if requests for this previous chunk have been received from a plurality of different sending sources for a predetermined time interval, the target request determining unit 304 determines the received request to be a target request.

The delay amount determining unit 305 determines a delay amount for a received request which is determined to be a target request by the target request determining unit 304. This delay amount is an amount by which the execution of regular reception processing for the received request will be delayed.

More specifically, the delay amount determining unit 305 determines a delay amount to be applied to a subject target request according to the following equation (1) or (2):

$$\text{delay amount} = \alpha \times x \quad (1)$$

$$\text{delay amount} = \alpha \times x - (RecvT\_order - RecvT\_0) \quad (2)$$

where $\alpha$ denotes a certain value greater than 0; x denotes the average time from which requests for a previous chunk prior to the chunk corresponding to the received request or the same chunk as the chunk corresponding to the received request which can be determined from the request statistical table 302 have been forwarded to an upstream relay node or the publisher until when items of data for these requests have arrived; order is the arrival order of the subject target request counting from the state in which there is no target request which is being subjected to delay processing by the delay processing unit 306; $RecvT\_order$ denotes a reception time of the subject target request; and $RecvT\_0$ denotes a reception time of a target request that has arrived first counting from the state in which there is no target request which is being subjected to delay processing by the delay processing unit 306. If the subject target request is the first target request that has arrived first without any target request which is being subjected to delay processing by the delay processing unit 306, a delay amount is determined by using equation (1). If the subject target request is not the first target request, a delay amount is determined by using equation (2).

In this example, the delay amount determining unit 305 determines a delay amount by using equation (1) or (2). However, the delay amount determining unit 305 may perform delay processing for a target request in a different manner. For example, if the number of requests received from different sending sources for a previous chunk prior to the chunk of a received request is indicated by y, the delay amount determining unit 305 may delay processing for the received request until β×y target requests are received from different sending sources (β is defined by 0<β≤1).

Alternatively, the delay amount determining unit 305 may perform one of the above-described two types of determination processing by setting α or β in a stepwise manner in accordance with the processing load on the relay node 300 or the traffic sent and received by the relay node 300.

Alternatively, the delay amount determining unit 305 may determine a delay amount by using one or certain plural items of: the position of a received request in order in which requests for the same chunk as the chunk of the received request received from sending sources have arrived (the position of the received request can be determined from the request statistical table 302); a time difference between the reception time of the received request and the reception time of a request for the same chunk as the chunk of the received request from a different sending source (the time difference can be determined from the request statistical table 302); the time or the number of requests received for a previous chunk prior to the chunk of the received request that can be determined from the request statistical table 302; the time from which a request for the same chunk as the chunk of the received request or a previous chunk prior to the chunk of the received request which can be determined from the request statistical table 302 has been forwarded to an upstream relay node or the publisher until when data for the request has arrived; the processing load on the relay node 300; the traffic sent and received by the relay node 300; and the type of content or application.

If there is a delay amount for a target request determined by the delay amount determining unit 305, the delay processing unit 306 performs delay processing for the received request (target request). That is, the delay processing unit 306 applies a delay for the determined delay amount to the received request, and then instructs the request processing unit 310 to perform regular request reception processing.

The content storage device 307 is a storage region in which content messages are temporarily stored in association with their names.

The PIT 308 retains therein a name described in an interest message and interface information concerning an interface from which the interest message has been received until a content message corresponding to the name is received and forwarded.

The FIB 309 stores therein routing information provided in units of names or name spaces.

The request processing unit 310 performs request reception processing. This will be discussed more specifically. On the basis of the name of a chunk included in a received request, the request processing unit 310 searches the content storage device 307 for content data corresponding to the name of the chunk. If the content data is found in the content storage device 307, the request processing unit 310 sends this content data from the interface 301 that has received the received request. If the content data is not found in the content storage device 307, the request processing unit 310 searches the PIT 308 for an entry for the chunk included in the received request on the basis of the name of the chunk. If such an entry is found in the PIT 308 and if information concerning the interface 301 that has received the received request is not included in this entry, the request processing unit 310 adds information concerning the interface 301 to this entry. If such an entry is found in the PIT 308 and if information concerning the interface 301 is included in this entry, the request processing unit 310 does not add information concerning the interface 301. If such an entry is not found in the PIT 308, the request processing unit 310 generates an entry for the name of the chunk included in the received request and adds information concerning the interface 301 to this entry. If such an entry is not found in the PIT 308, in order to forward the received request, the request processing unit 310 also searches the FIB 309 on the basis of the name of the chunk included in the received request so as to determine the forwarding interface 301, and then sends the received request from the forwarding interface 301. The request processing unit 310 may write a forwarding time of the received request into the request statistical table 302 if necessary.

Upon receiving content data corresponding to the chunk via the interface 301, the data processing unit 311 extracts the entry for the name of the chunk included in received data from the PIT 308 on the basis of the name of the chunk, and forwards the received data to all interfaces 301 recorded in the entry. The data processing unit 311 also stores the received content data in association with the name of the chunk in the content storage device 307. The data processing unit 311 may write a reception time of the content data into the request statistical table 302 if necessary.

The operation performed by the relay node 300 configured as described above will be described below.

Figure 5:
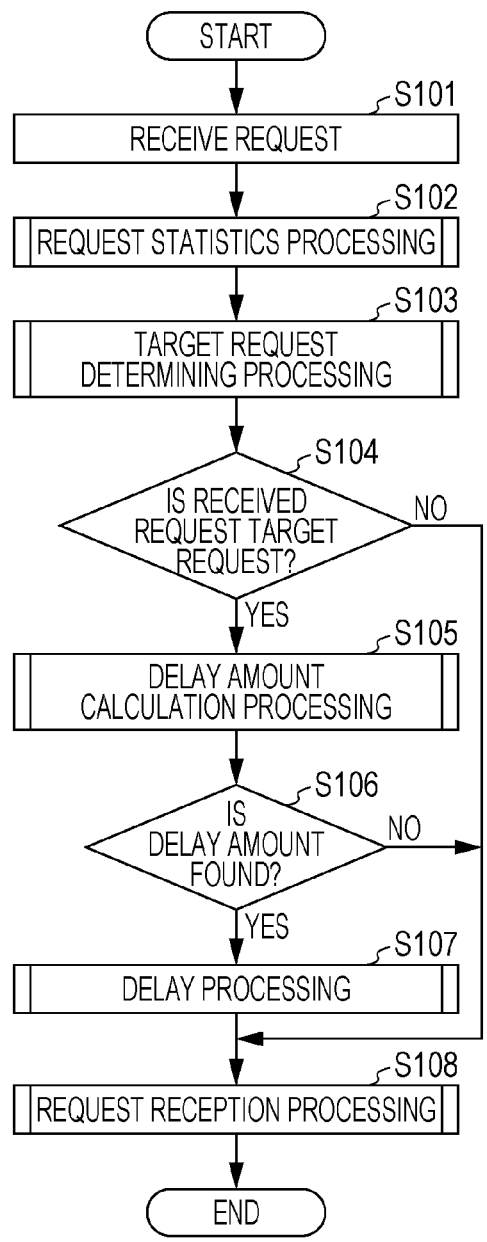
FIG. 5 is a flowchart illustrating an operation performed by the relay node of Embodiment 1.

FIG. 5 is a flowchart illustrating the operation performed by the relay node 300 of Embodiment 1.

In step S101, the relay node 300 receives a request for a chunk divided from a certain item of content. Then, in step S102, the request statistics processing unit 303 performs request statistics processing for the received request.

Figure 6:
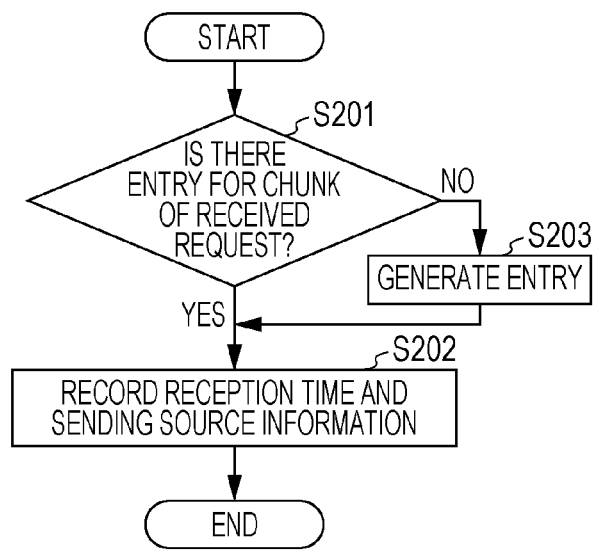
FIG. 6 is a flowchart illustrating request statistics processing.

FIG. 6 is a flowchart illustrating request statistics processing in step S102.

In step S201, the request statistics processing unit 303 first determines whether or not there is an entry for the chunk of the received request in the request statistical table 302. If there is such an entry (the result of step S201 is YES), the process proceeds to step S202. In step S202, the request statistics processing unit 303 records a reception time and sending source information concerning the received request in this entry. If there is no such an entry (the result of step S201 is NO), the process proceeds to step S203. In step S203, the request statistics processing unit 303 creates an entry for the chunk corresponding to the received request in the request statistical table 302. Then, in step S202, the request statistics processing unit 303 records a reception time and sending source information concerning the received request in the created entry.

Figure 7:
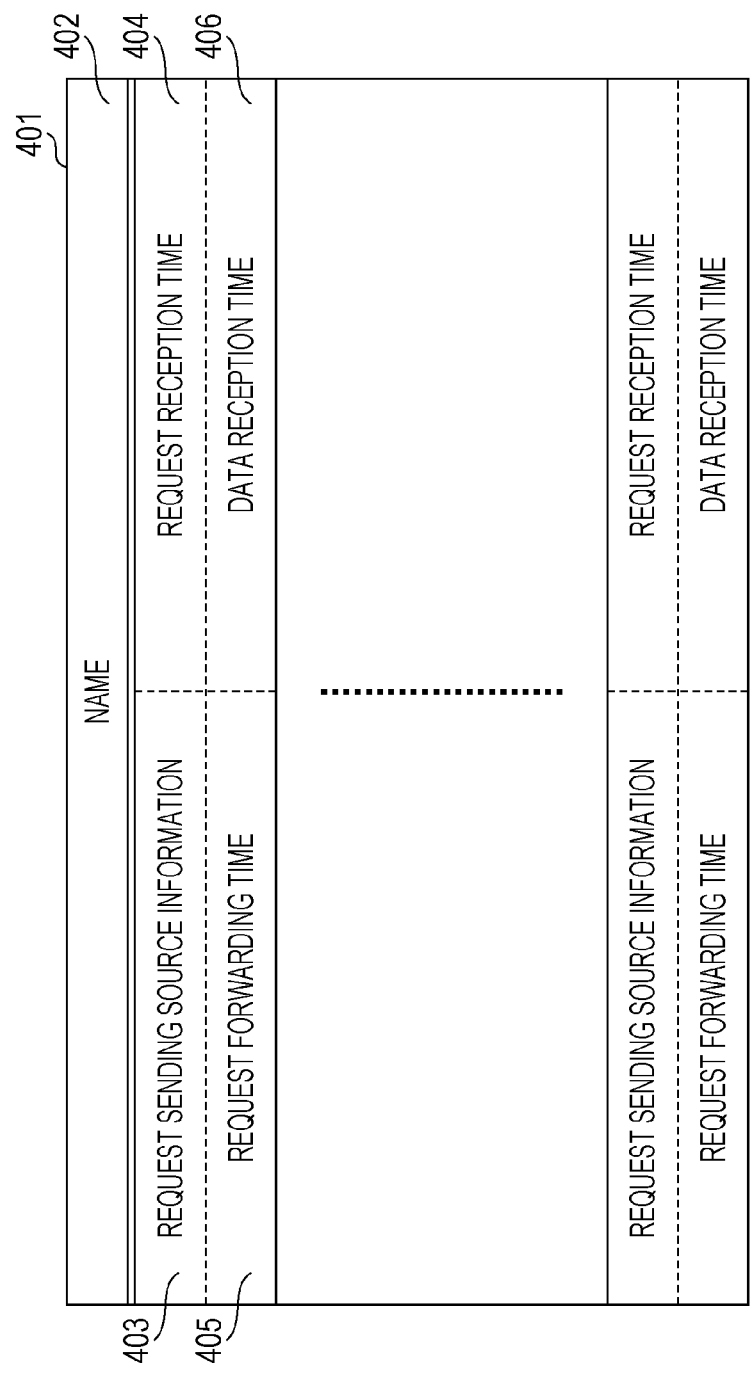
FIG. 7 illustrates an example of an entry generated for each chunk and stored in a request statistical table.

FIG. 7 illustrates an example of an entry 401 generated for a chunk and stored in the request statistical table 302.

In the entry 401, a name 402, request sending source information 403, a request reception time 404, a request forwarding time 405, and a data reception time 406 are stored. The entry 401 is generated for the name 402, that is, an entry is generated for each chunk, and retains therein at least one set of the request sending source information 403, the request reception time 404, the request forwarding time 405, and the data reception time 406 which form information concerning a request sent from a sending source. In the entry 401, plural sets of such items of information concerning requests sent from different sending sources may be stored. It is not always necessary to store the request forwarding time 405 and the data reception time 406 in the entry 401.

In the name 402, information concerning the name of a chunk is stored. In the request sending source information 403, information concerning a request sending source, for example, a media access control (MAC) address, is stored. In the request reception time 404, a time at which a request was received is stored. In the request forwarding time 405, a time at which a request was sent by the request processing unit 310 is stored. In the data reception time 406, a time at which data was received by the data processing unit 311 is stored.

Although it is not shown in the flowchart of FIG. 6, if a new request is not received for an entry for a certain time interval or longer, the request statistics processing unit 303 deletes this entry from the request statistical table 302.

Referring back to the description of the flowchart of FIG. 5, the target request determining unit 304 performs target request determining processing in step S103. In target request determining processing, the target request determining unit 304 refers to the request statistical table 302 to determine whether or not the received request is set to be a target request.

Figure 8:
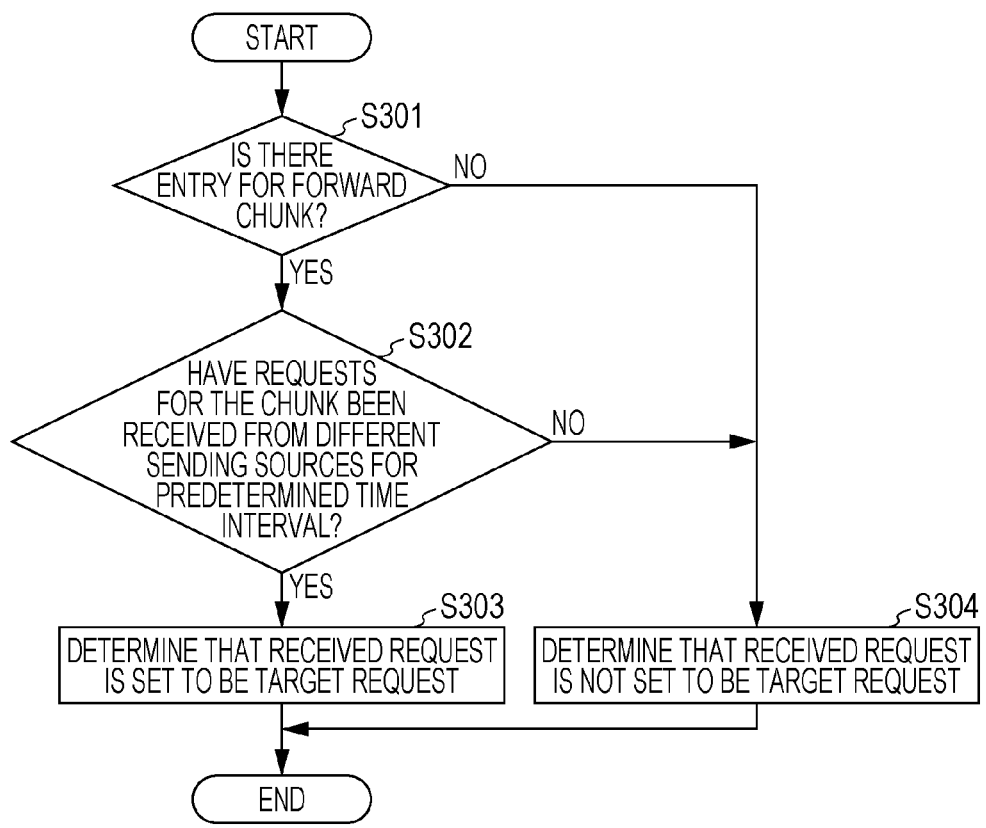
FIG. 8 is a flowchart illustrating target request determining processing.

FIG. 8 is a flowchart illustrating target request determining processing in step S103.

In step S301, the target request determining unit 304 refers to the request statistical table 302 to determine whether or not there is an entry for a previous chunk positioned prior to the chunk corresponding to the received request. In this case, the target request determining unit 304 determines the order of multiple chunks forming the content data by referring to a time stamp or a sequence number included in the name 101 shown in FIG. 1A, and then makes a determination of step S301.

If there is an entry for a previous chunk (the result of step S301 is YES), the process proceeds to step S302. In step S302, the target request determining unit 304 refers to the entry for the previous chunk and determines whether or not requests for this previous chunk have been received from a plurality of different sending sources for a certain time interval. If such requests have been received from different sending sources (the result of step S302 is YES), the process proceeds to step S303. In step S303, the target request determining unit 304 determines that the received request is set to be a target request.

If it is determined in step S301 that there is no entry for a previous chunk (the result of step S301 is NO) or if it is determined in step S302 that such requests have not been received from different sending sources (the result of step S302 is NO), the process proceeds to step S304. In step S304, the target request determining unit 304 determines that the received request is not set to be a target request.

Referring back to the description of the flowchart of FIG. 5, the delay amount determining unit 305 determines in step S104 whether or not the received request is set to be a target request as a result of performing target request determining processing in step S103. If it is determined that the received request is set to be a target request (the result of step S104 is YES), the process proceeds to step S105. In step S105, the delay amount determining unit 305 performs delay amount determination processing. In delay amount determination processing, the delay amount determining unit 305 determines a delay amount for the target request by using the above-described equation (1) or (2). In contrast, if it is determined in step S104 that the received request is not set to be a target request (the result of step S104 is NO), the process proceeds to step S108. In step S108, regular request reception processing is performed.

Then, in step S106, the delay processing unit 306 determines whether or not a delay is found in the target request as a result of performing delay amount determination processing. If it is determined that a delay is found (the result of step S106 is YES), the process proceeds to step S107. In step S107, the delay processing unit 306 performs delay processing for the received request. In delay processing, the delay processing unit 306 applies a delay for the determined delay amount to the received request (target request), and then instructs the request processing unit 310 to perform regular request reception processing (step S108). In contrast, if it is determined in step S106 that a delay is not found (the result of step S106 is NO), the process proceeds to step S108 in which regular request reception processing is performed.

Figure 9:
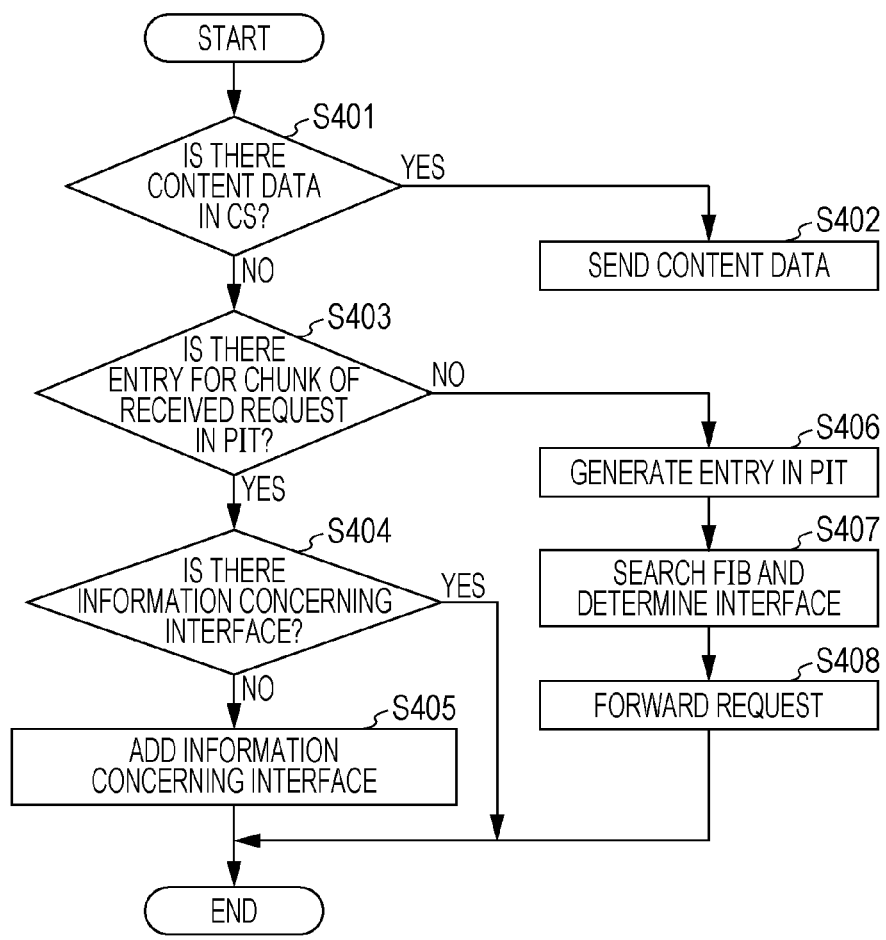
FIG. 9 is a flowchart illustrating regular request reception processing.

FIG. 9 is a flowchart illustrating regular request reception processing in step S108.

In step S401, the request processing unit 310 searches the content storage device 307 and determines, on the basis of the name of the chunk included in the received request, whether or not content data corresponding to the name of the chunk is stored in the content storage device 307. If it is determined as a result of a search that the content data is stored (the result of step S401 is YES), the process proceeds to step S402. In step S402, the request processing unit 310 sends this content data from the interface 301 that has received the received request.

If it is determined in step S401 that the content data is not stored (the result of step S401 is NO), the process proceeds to step S403. In step S403, the request processing unit 310 searches the PIT 308 and determines, on the basis of the name of the chunk, whether or not an entry for the chunk included in the received request is stored in the PIT 308. If it is determined as a result of a search that such an entry is found in the PIT 308, the process proceeds to step S404. In step S404, the request processing unit 310 determines whether or not information concerning the interface 301 that has received the received request is included in this entry. If it is determined that information concerning the interface 301 is not stored (the result of step S404 is NO), the process proceeds to step S405. In step S405, the request processing unit 310 adds information concerning the interface 301 to this entry. If it is determined that information concerning the interface 301 is stored (the result of step S404 is YES), the request processing unit 310 does not add information concerning the interface 301.

On the other hand, if an entry for the chunk included in the received request is not stored in the PIT 308 (the result of step S403 is NO), the process proceeds to step S406. In step S406, the request processing unit 310 generates an entry for the name of the chunk included in the received request, stores the generated entry in the PIT 308, and then adds information concerning the interface 301 to this entry. Then, in step S407, in order to forward the received request, the request processing unit 310 searches the FIB 309 on the basis of the name of the chunk included in the received request so as to determine the forwarding interface 301. Then, in step S408, the request processing unit 310 sends (forwards) the received request from the forwarding interface 301. In this case, the request processing unit 310 may write a forwarding time of the received request into the request statistical table 302 if necessary.

An example of a sequence of requests and content data when the relay node 300 configured as described above is used.

Figure 10:
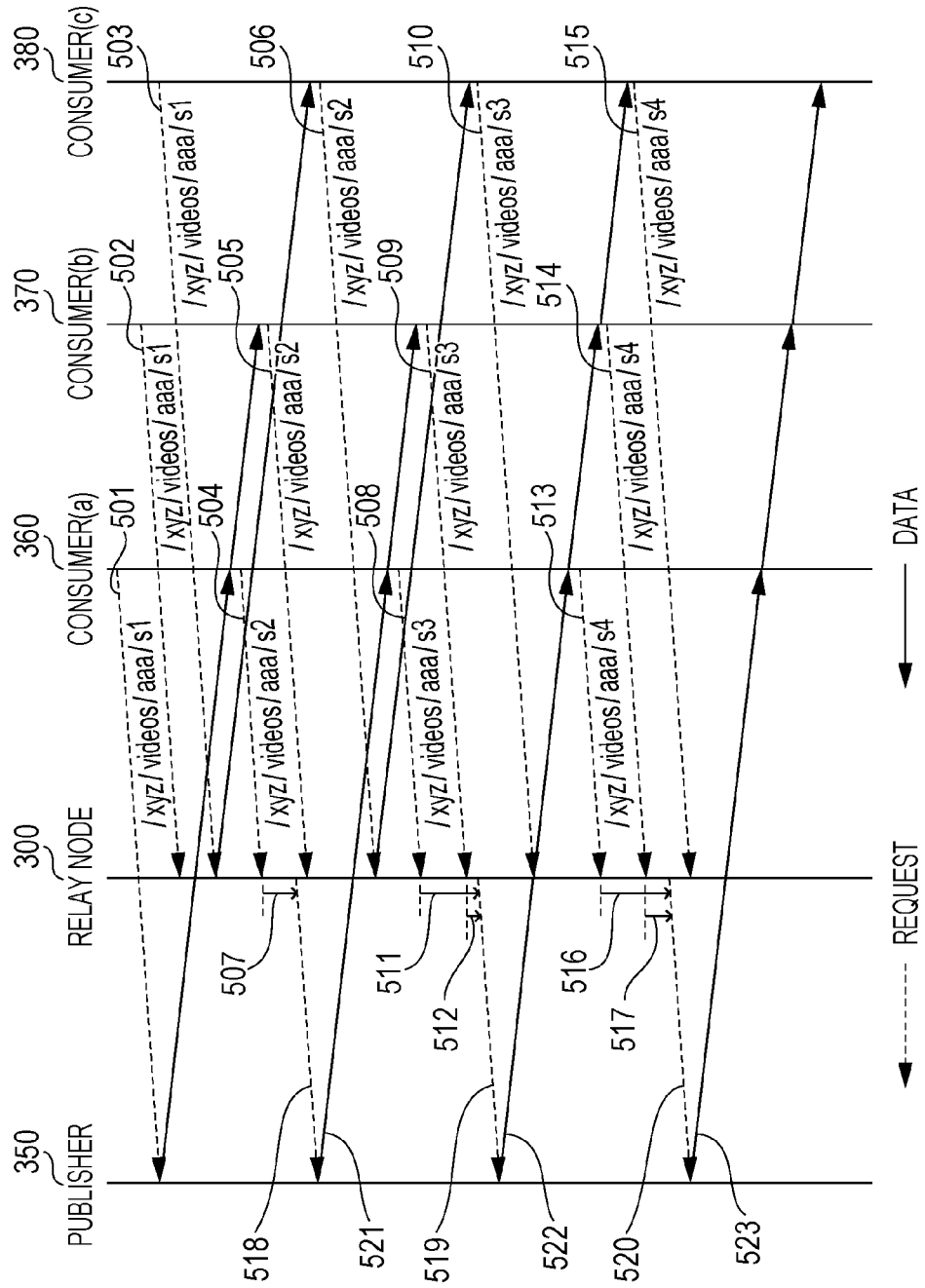
FIG. 10 illustrates an example of a sequence when a plurality of consumers obtain the same item of content data from a publisher via a relay node.

FIG. 10 illustrates an example of the sequence when a plurality of consumers 360, 370, and 380 obtain the same item of content data from a publisher 350 via the relay node 300.

In the example shown in FIG. 10, in order to obtain the same item of content data, the consumers 360, 370, and 380 send requests for a series of chunks divided from the content data at different timings. In this sequence, requests 501 through 503 are requests for the same chunk, and requests 504 through 506 are requests for the same chunk subsequent to the chunk corresponding to the requests 501 through 503. Then, requests 508 through 510 and requests 513 through 515 sequentially follow the requests 504 through 506.

Upon receiving the requests 501 through 503 for the same chunk divided from the content data, the relay node 300 performs request statistics processing (step S102) so as to generate or update an entry for the chunk. That is, the request statistics processing unit 303 generates an entry when receiving the request 501, and updates this entry when receiving the request 502 or 503. In the example shown in FIG. 10, however, there is no entry for a previous chunk prior to the chunk of the requests 501 through 503. Accordingly, the requests 501 through 503 are not determined to be target requests in target request determining processing (step S103), and instead, regular request reception processing is performed.

Then, upon receiving the requests 504 through 506, 508 through 510, and 513 through 515, the relay node 300 performs request statistics processing (step S102) so as to generate or update an entry for each chunk. That is, the request statistics processing unit 303 generates entries when receiving the requests 504, 508, and 513, and updates the entries when receiving the requests 505, 506, 509, 510, 514, and 515. Then, target request determining processing (step S103) is performed. In this case, there is an entry for a previous chunk, that is, the chunk of the requests 501 through 503, and also, requests for the previous chunk have been received from a plurality of different sending sources (consumers 360 through 380) for a predetermined time interval (assuming that the requests 501 through 503 have been received during the predetermined time interval). Accordingly, the requests 504 through 506, 508 through 510, and 513 through 515 are determined to be target requests. Then, in delay amount determination processing (step S105), a delay amount for a target request is determined. Among a plurality of target requests for identical chunks, a delay is applied to each of the requests 504, 508, 509, 513, and 514 that have been received earlier. More specifically, a delay 507 is applied to processing 518 for forwarding the request 504 to an upstream relay node or the publisher 350. Delays 511 and 512 are applied to processing 519 for forwarding the requests 508 and 509, respectively, to an upstream relay node or the publisher 350. Delays 516 and 517 are applied to processing 520 for forwarding the requests 513 and 514, respectively, to an upstream relay node or the publisher 350. With the application of delay, the reception of items of content data 521 through 523 by the consumers 360 and 370 in response to the requests 504, 505, 508, 509, 513, and 514 is delayed, and a timing at which the consumers 360 and 370 send a next request is also delayed. As a result, by performing the above-described operation, the time difference at which requests for the same chunk sent from the plurality of consumers 360 through 380 reach the relay node 300 is reduced.

Figure 11:
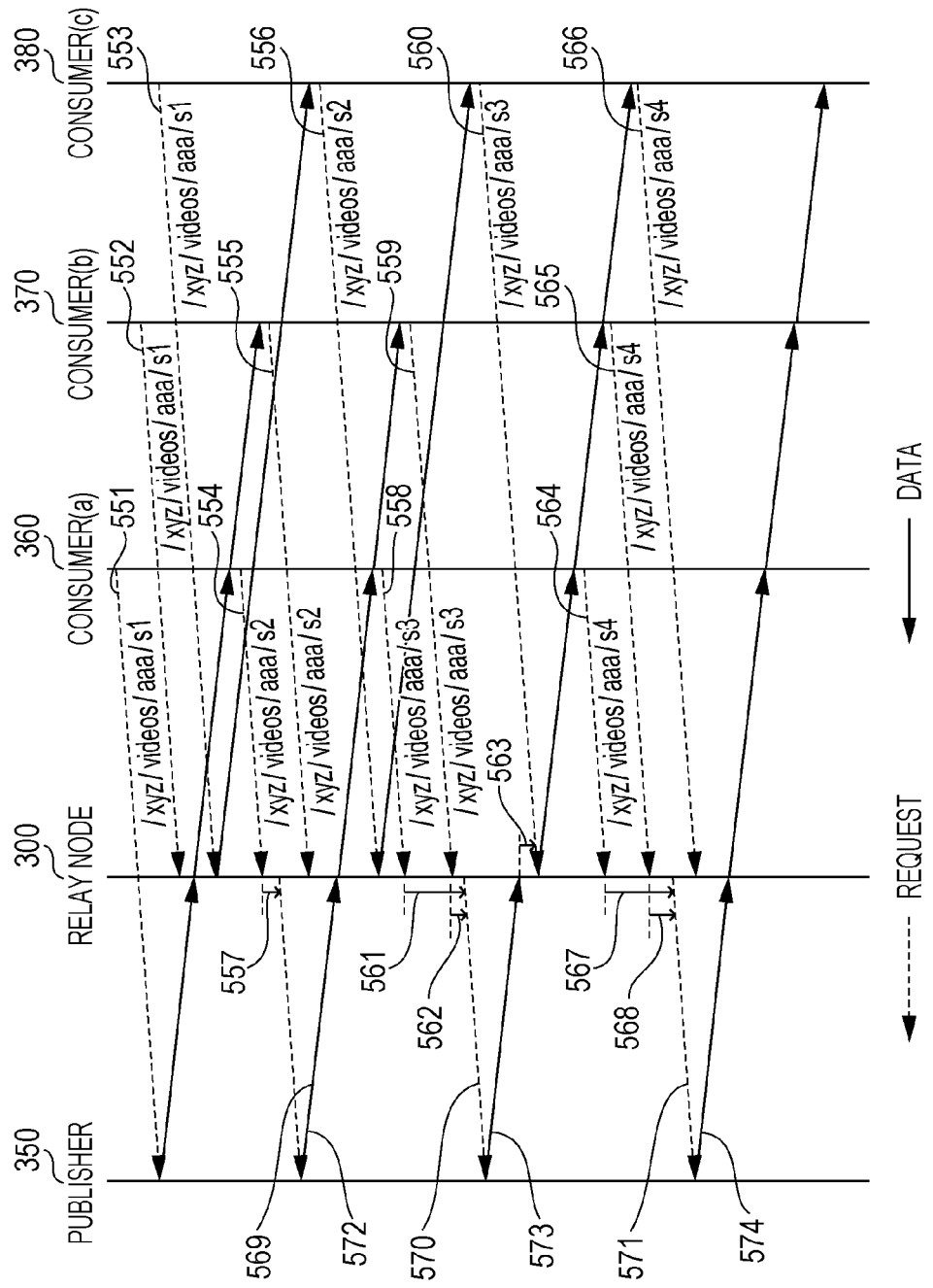
FIG. 11 illustrates another example of a sequence when a plurality of consumers obtain the same item of content data from a publisher via a relay node.

In the example shown in FIG. 10, a delay is applied to processing for forwarding a request to an upstream relay node or the publisher 350. However, a delay may be applied to another type of processing. For example, if content data is already stored in the content storage device 307, a delay may be applied to processing for sending this content data to a downstream relay node or a consumer, as shown in FIG. 11. In the example shown in FIG. 11, a delay 563 is applied to processing for sending content data 573 received from the publisher 350 to a consumer.

As described above, among target requests for the same chunk sent from a plurality of consumers, forwarding of a target request which reaches a relay node first to an upstream relay node or a publisher or sending of data in response to a request is delayed. Meanwhile, a consumer encounters a delay in receiving data in response to a request, and judges that network congestion has occurred. Then, in order to reduce the congestion, the consumer decreases the transmission rate for a series of subsequent requests or does not send a new request until a subsequent item of data is received.

By performing the above-described operation, the arrival of multiple requests for the same chunk at a relay node is localized on the time axis. This makes it possible to further promote the traffic aggregation by using a mechanism, such as a content storage device or a PIT, used in CCN, thereby reducing the traffic of the entire network. The efficiency in utilizing a memory region of a content storage device of a relay node is also increased. Additionally, due to the efficient and effective function of a content storage device or a PIT of a relay node, the number of times a publisher has to send data in response to requests is decreased, thereby reducing the processing load on the publisher.

Figure 12:
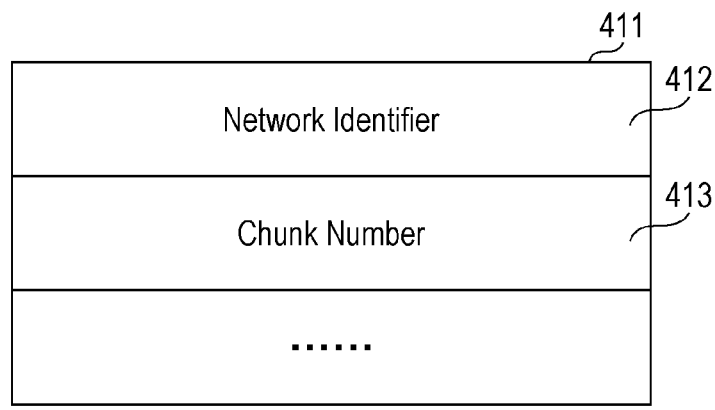
FIG. 12 illustrates an example of the format of a request used in a content network (CONET)

Embodiment 1 has been discussed in the context of CCN as an example. However, content network (CONET), which is being proposed as an ICN architecture different from CCN, may be used. FIG. 12 illustrates an example of the format of a request 411 used in CONET.

As shown in FIG. 12, the request 411 at least includes a network identifier 412 and a chunk number 413. The network identifier 412 is an identifier of a piece of content, and the chunk number 413 is a chunk number assigned to a chunk positioned in the order of multiple chunks forming this piece of content. For example, by referring to the network identifier 412 and the chunk number 413 described in the request 411, the target request determining unit 304 determines the position of a chunk in the order of multiple chunks forming content data.

Figure 13:
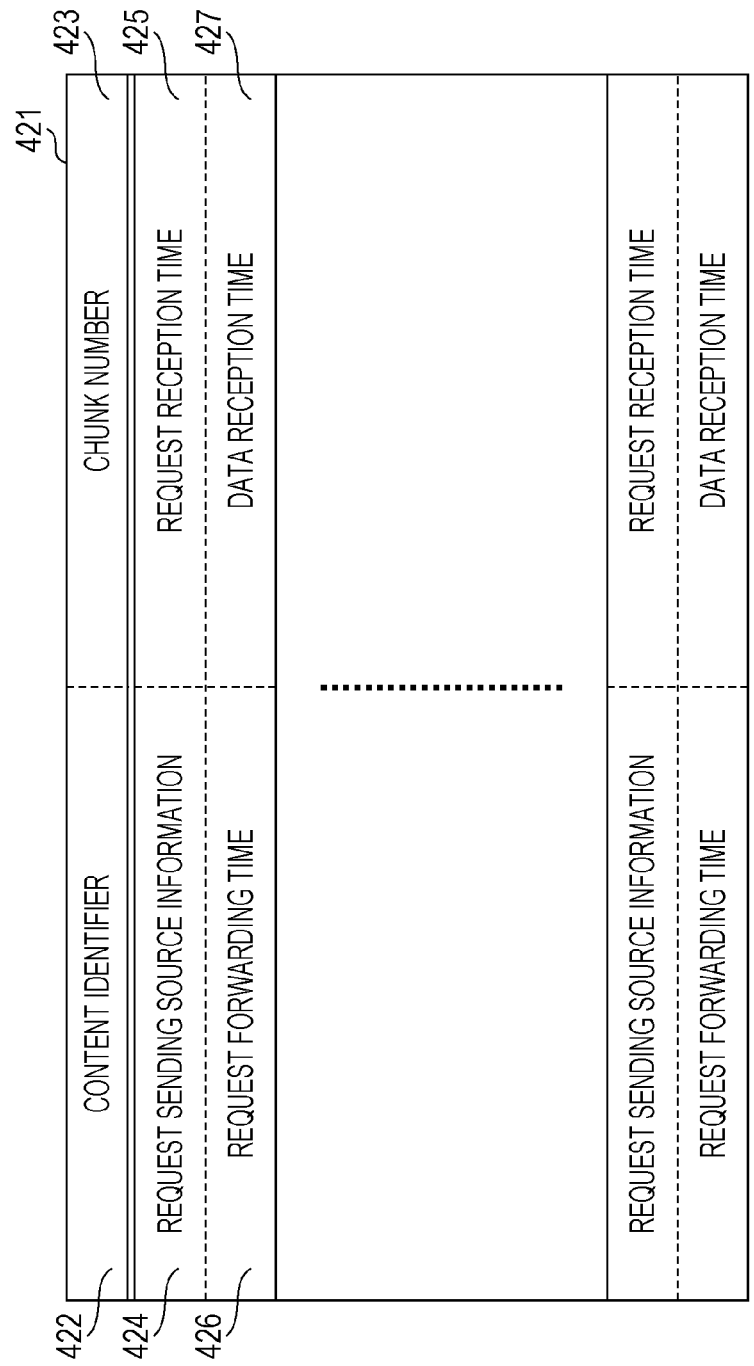
FIG. 13 illustrates an example of an entry generated for each chunk and stored in a request statistical table when CONET is utilized.

FIG. 13 illustrates an entry 421 generated for a chunk and stored in the request statistical table 302 when CONET is utilized.

In the entry 421, a content identifier 422, a chunk number 423, request sending source information 424, a request reception time 425, a request forwarding time 426, and a data reception time 427 are stored. The entry 421 is generated for a chunk specified by the content identifier 422 and the chunk number 423, and retains therein at least one set of the request sending source information 424, the request reception time 425, the request forwarding time 426, and the data reception time 427 which form information concerning a request sent from a sending source. In the entry 421, plural sets of such items of information concerning requests sent from different sending sources may be stored. It is not always necessary to store the request forwarding time 426 and the data reception time 427 in the entry 421.

In the content identifier 422, the network identifier 411 shown in FIG. 12, for example, is stored. In the chunk number 423, the chunk number 412 shown in FIG. 12, for example, is stored. In the request sending source information 424, information concerning a request sending source, for example, a MAC address, is stored. In the request reception time 425, a time at which a request was received is stored. In the request forwarding time 426, a time at which a request was sent by the request processing unit 310 is stored. In the data reception time 427, a time at which data was received by the data processing unit 311 is stored.

In Embodiment 1, a description has been given of a case in which a plurality of consumers make a request for content data divided in units of chunks in order starting from the first chunk at the head of the content data. However, the present disclosure may be applicable to a case in which the requesting order of a plurality of items of content data is determined in advance or is predictable.

Embodiment 2

Figure 14:
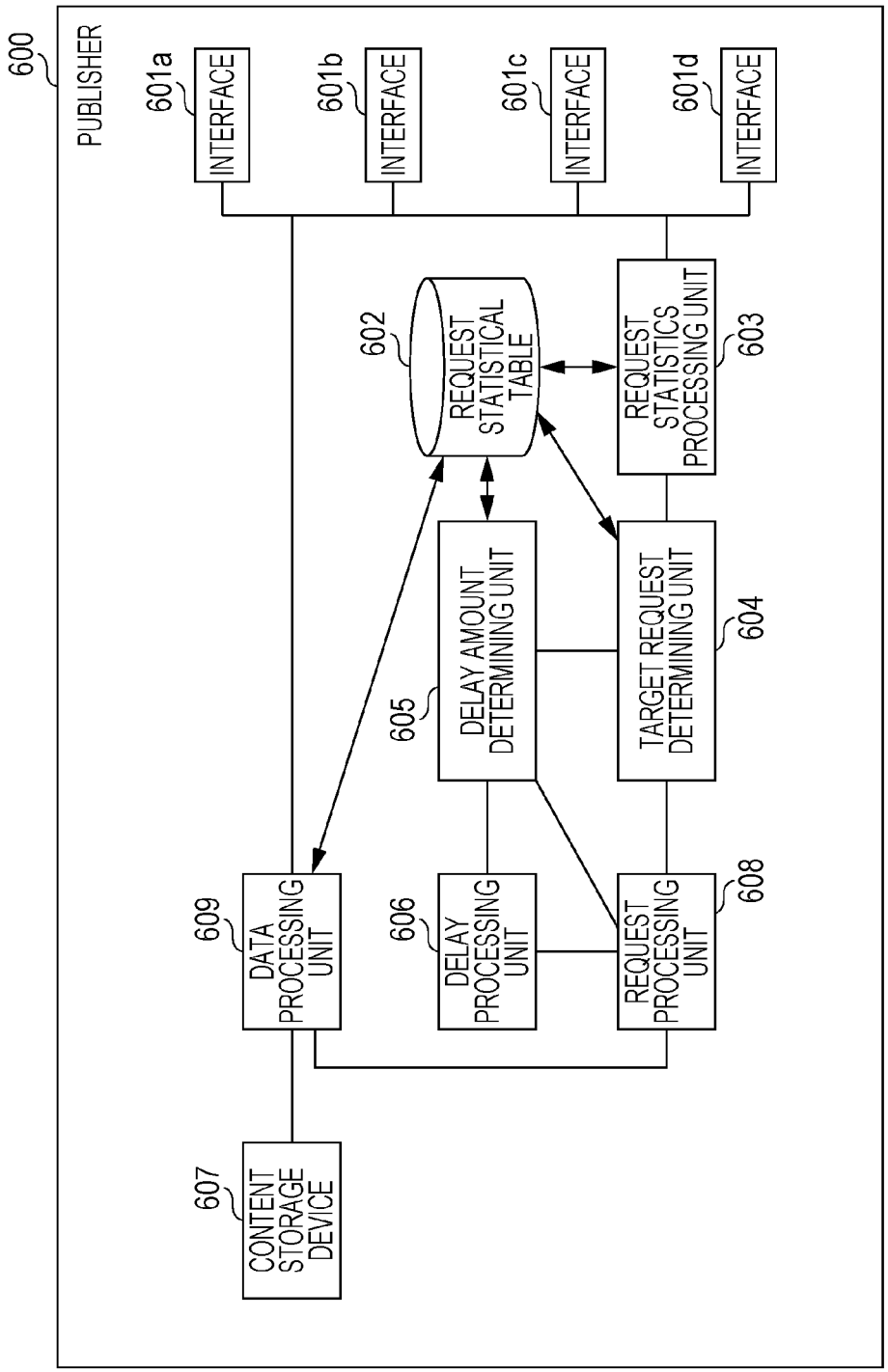
FIG. 14 is a block diagram illustrating an example of the configuration of a publisher according to Embodiment 2.

In Embodiment 1, a relay node has been discussed. In Embodiment 2, a publisher (server apparatus) will be discussed. FIG. 14 is a block diagram illustrating an example of the configuration of a publisher 600 according Embodiment 2.

The publisher 600 is a server apparatus that receives a request for content data divided in units of chunks and sends content data corresponding to a received request in ICN. The publisher 600 includes, as shown in FIG. 14, four interfaces 601 (601a through 601d), a request statistical table 602, a request statistics processing unit 603, a target request determining unit 604, a delay amount determining unit 605, a delay processing unit 606, a content storage device 607, a request processing unit 608, and a data processing unit 609. Although in this embodiment four interfaces 601 are provided, the number of interfaces 601 is not restricted as long as at least two interfaces 601 are provided. The interfaces 601a through 601d will be collectively referred to as the interface 601 unless it is necessary to distinguish between them.

The interface 601 is a communication unit that sends and receives requests and items of content data corresponding to the requests, and is connected to a relay node, which is a data relay apparatus, or a consumer, which is a terminal apparatus.

The request statistical table 602 is a table in which items of information concerning requests received by the interface 601 are stored in entries generated in units of chunks.

Figure 15:
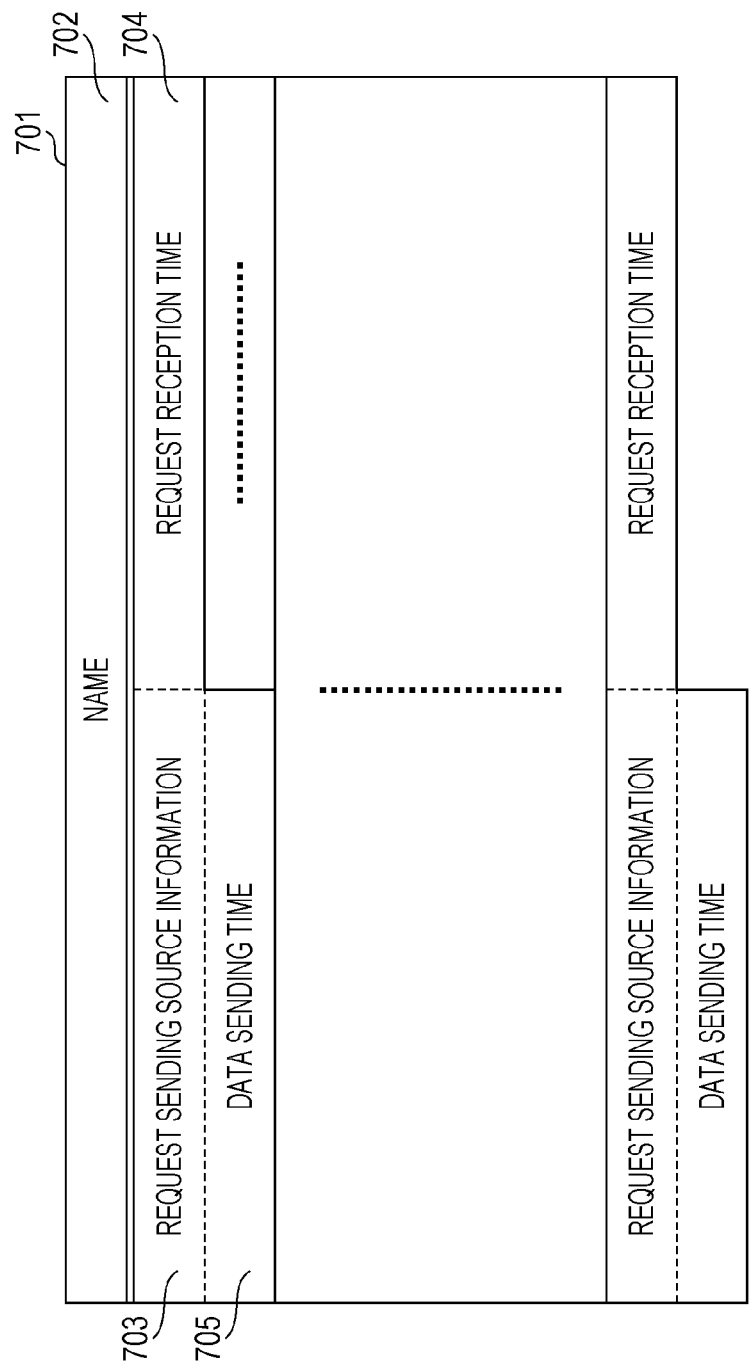
FIG. 15 illustrates an example of an entry generated for each chunk and stored in a request statistical table.

FIG. 15 illustrates an example of an entry 701 generated for a chunk and stored in the request statistical table 602.

In the entry 701, a name 702, request sending source information 703, a request reception time 704, and a data sending time 705 are stored. The entry 701 is generated for the name 702, that is, an entry is generated for each chunk, and retains therein at least one set of the request sending source information 703, the request reception time 704, and the data sending time 705 which form information concerning a request sent from a sending source. In the entry 701, plural sets of such items of information concerning requests sent from different sending sources may be stored. It is not always necessary to store the data sending time 705 in the entry 701.

In the name 702, information concerning the name of a chunk is stored. In the request sending source information 703, information concerning a request sending source, for example, a MAC address, is stored. In the request reception time 704, a time at which a request was received is stored. In the data sending time 705, a time at which data was sent by the data processing unit 609 is stored.

Upon receiving a request for a chunk by the interface 601, the request statistics processing unit 603 performs request statistics processing. More specifically, the request statistics processing unit 603 records a reception time and sending source information concerning a received request in an entry of the associated chunk in the request statistical table 602. The request statistics processing unit 603 also deletes an entry of a chunk for which a new request is not received for a predetermined time interval or longer.

The target request determining unit 604 performs target request determining processing. More specifically, the target request determining unit 604 refers to the request statistical table 602 and performs the following determination. If there is an entry for a previous chunk positioned prior to a chunk corresponding to a received request, and if requests for this previous chunk have been received from a plurality of different sending sources for a predetermined time interval, the target request determining unit 604 determines the received request to be a target request.

The delay amount determining unit 605 determines a delay amount for a received request which is set to be a target request by the target request determining unit 604. This delay amount is an amount by which the execution of regular reception processing for the received request will be delayed.

More specifically, the delay amount determining unit 605 determines a delay amount to be applied to a subject target request according to the following equation (3) or (4):

$$\text{delay amount} = \alpha \times x \quad (3)$$

$$\text{delay amount} = \alpha \times x - (\text{RecvT\_order} - \text{RecvT\_0}) \quad (4)$$

where $\alpha$ denotes a certain value greater than 0; x denotes the average of time intervals for which requests for a previous chunk prior to the chunk corresponding to the received request which can be determined from the request statistical table 602 have arrived (the time intervals can be determined from the request reception time 704 of the request statistical table 602); order is the arrival order of the subject target request counting from the state in which there is no target request which is being subjected to delay processing by the delay processing unit 606; RecvT_order denotes a reception time of the subject target request; and RecvT_0 denotes a reception time of a target request that has arrived first counting from the state in which there is no target request which is being subjected to delay processing by the delay processing unit 606. If the subject target request is the target request that has arrived first without any target request which is being subjected to delay processing by the delay processing unit 606, a delay amount is determined by using equation (3). If the subject target request is not the first target request, a delay amount is determined by using equation (4).

In this example, the delay amount determining unit 605 determines a delay amount by using equation (3) or (4). However, the delay amount determining unit 605 may perform delay processing for a target request in a different manner. For example, if the number of requests received from different sending sources for a previous chunk prior to the chunk of a received request is indicated by y, the delay amount determining unit 605 may delay processing for a received request until $\beta \times y$ target requests are received from different sending sources ($\beta$ is defined by $0 < \beta \leq 1$).

Alternatively, the delay amount determining unit 605 may perform one of the above-described two types of determination processing by setting $\alpha$ or $\beta$ in a stepwise manner in accordance with the processing load on the publisher 600 or the traffic sent and received by the publisher 600.

Alternatively, the delay amount determining unit 605 may determine a delay amount by one or certain plural items of: the position of a received request in order in which requests for the same chunk as the chunk of the received request received from sending sources arrive (the position of the received request can be determined from the request statistical table 602); a time difference between the reception time of the received request and the reception time of a request for the same chunk as the chunk of the received request from a different sending source (the time difference can be determined from the request statistical table 602); the time or the number of requests received for a previous chunk prior to the chunk of the received request that can be determined from the request statistical table 602; the processing load on the publisher 600; the traffic sent and received by the publisher 600; and the type of content or application.

If there is a delay amount for a target request determined by the delay amount determining unit 605, the delay processing unit 606 performs delay processing for the received request (target request). That is, the delay processing unit 606 applies a delay for the determined delay amount to the received request, and then instructs the request processing unit 608 to perform regular request reception processing.

The content storage device 607 is a storage unit in which items of content data are stored in association with their names.

The request processing unit 608 performs request reception processing. More specifically, on the basis of the name of a chunk included in a received request, the request processing unit 608 instructs the data processing unit 609 to send content data.

The data processing unit 609 obtains content data corresponding to the name of the chunk received in the received request from the content storage device 607 and converts the content data into sending data. Then, the data processing unit 609 sends the data from the interface 601 that has received the received request. The data processing unit 609 may write a sending time of the content data into the request statistical table 602 if necessary.

The operation performed by the publisher 600 configured as described above will be discussed below. The operation performed by the publisher 600 is similar to that of the relay node 300 of Embodiment 1, and thus, it will be discussed with reference to FIG. 5.

In step S101, the publisher 600 receives a request for a chunk. Then, in step S102, the request statistics processing unit 603 performs request statistics processing for the received request. The flow of request statistics processing is similar to that performed by the relay node 300 of Embodiment 1 shown in FIG. 6.

Then, in step S103, the target request determining unit 604 performs target request determining processing. In target request determining processing, the target request determining unit 604 refers to the request statistical table 602 to determine whether or not the received request is set to be a target request. The flow of target request determining processing is similar to that performed by the relay node 300 of Embodiment 1 shown in FIG. 8.

The delay amount determining unit 605 determines in step S104 whether or not the received request is set to be a target request as a result of performing target request determining processing in step S103. If it is determined that the received request is set to be a target request (the result of step S104 is YES), the process proceeds to step S105. In step S105, the delay amount determining unit 605 performs delay amount determination processing. In delay amount determination processing, the delay amount determining unit 605 determines a delay amount for the target request. In contrast, if it is determined in step S104 that the received request is not set to be a target request (the result of step S104 is NO), the process proceeds to step S108. In step S108, regular request reception processing is performed.

Then, in step S106, the delay processing unit 606 determines whether or not a delay is found in the target request as a result of delay amount determination processing. If it is determined that a delay is found (the result of step S106 is YES), the process proceeds to step S107. In step S107, the delay processing unit 606 performs delay processing for the received request. In delay processing, the delay processing unit 606 applies a delay for the determined delay amount to the received request (target request), and then instructs the request processing unit 608 to perform regular request reception processing (step S108). In contrast, if it is determined in step S106 that a delay is not found (the result of step S106 is NO), the process proceeds to step S108 in which regular request reception processing is performed.

In request reception processing in step S108, the request processing unit 608 instructs the data processing unit 609 to send content data on the basis of the name of the chunk included in the received request.

An example of a sequence of requests and content data when the publisher 600 configured as described above is used will be discussed.

Figure 16:
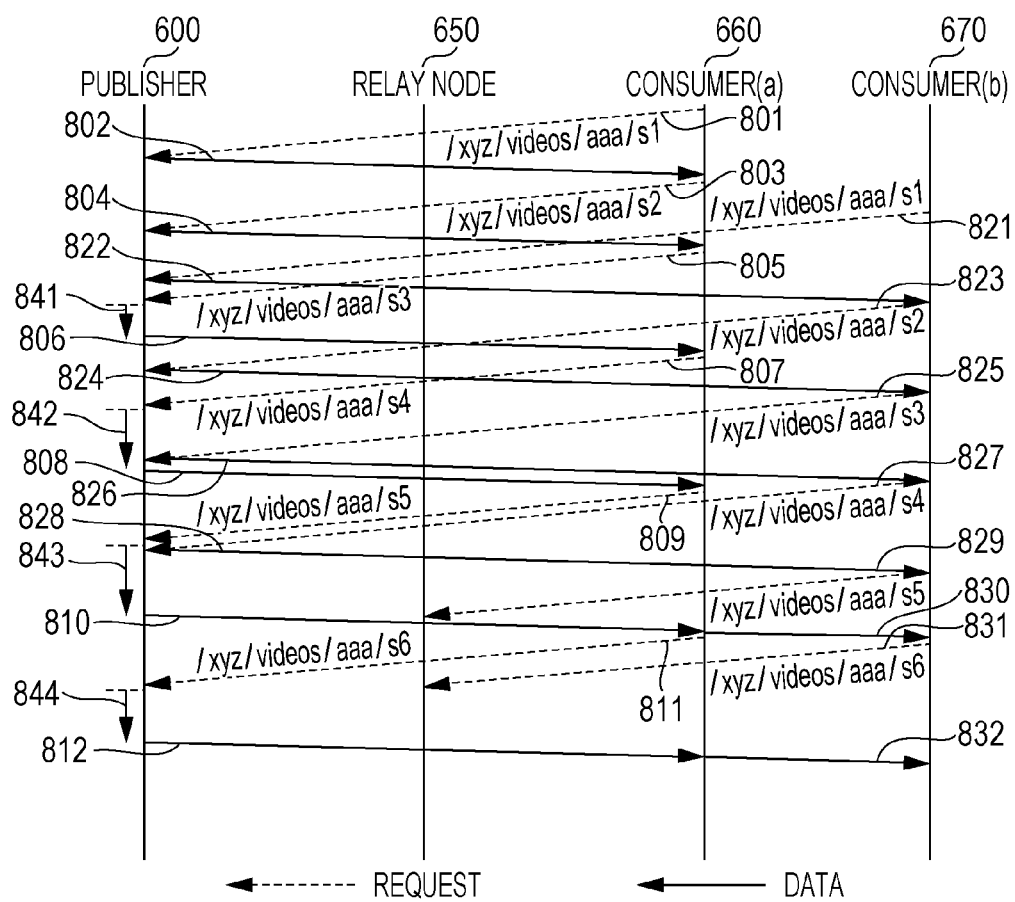
FIG. 16 illustrates an example of a sequence when a plurality of consumers obtain the same item of content data from a publisher via a relay node.

FIG. 16 illustrates an example of a sequence when a plurality of consumers 660 and 670 obtain the same item of content data from the publisher 600 via a relay node 650.

In the example shown in FIG. 16, in order to obtain the same item of content data, the consumers 660 and 670 send requests for a series of chunks divided from the content data at different timings. In this sequence, each of a pair of requests 801 and 821, a pair of requests 803 and 823, a pair of requests 805 and 825, a pair of requests 807 and 827, a pair of requests 809 and 829, and a pair of requests 811 and 831 are a pair of requests for the same chunk. The requests 803 and 823 are requests for the chunk subsequent to the chunk of the requests 801 and 821, respectively. Then, the requests 805 and 825, the requests 807 and 827, the requests 809 and 829, and the requests 811 and 831 sequentially follow. In the relay node 650, when receiving items of data 802, 804, 806, and 808 from the publisher 600 in response to the requests 801, 803, 805, and 807, respectively, the items of data 802, 804, 806, and 808 are cached in the content storage device 307. It is assumed, however, that, at the time points at which the requests 821, 823, 825, and 827 for the same chunks as those of the requests 801, 803, 805, and 807, respectively, are received, the items of data 802, 804, 806, and 808 are already erased from the content storage device 307 of the relay node 650 since a certain time has elapsed from the reception of the items of data 802, 804, 806, and 808 or other items of data are cached in the content storage device 307.

In the example shown in FIG. 16, upon receiving the request 801, the publisher 600 performs request statistics processing (step S102) so as to generate an entry for the chunk of the request 801. At this time, since there is no entry for a previous chunk prior to the chunk of the request 801, the request 801 is not determined to be a target request as a result of performing target request determining processing (step S103). Instead, regular request reception processing is performed, and the data 802 is sent as a chunk in response to the request 801.

Then, upon receiving the request 803, the request statistics processing unit 603 of the publisher 600 performs request statistics processing (step S102) so as to generate an entry for the chunk of the request 803. In this case, although there is an entry for a previous chunk positioned prior to the chunk of the request 803, a request for the previous chunk has been received only from the single sending source (consumer 660). Accordingly, in target request determining processing in step S103, the request 803 is not determined to be a target request. Instead, regular request reception processing is performed, and the data 804 is sent as a chunk in response to the request 803.

Upon receiving the requests 821, 823, 825, and 827, the request statistics processing unit 603 of the publisher 600 performs request statistics processing (step S102) so as to update entries for the corresponding chunks since the entries for these chunks have already been generated. At this time point, there are entries for the previous chunks positioned prior to the chunks of the requests 821, 823, 825, and 827, and also, requests for the previous chunks have been received from a plurality of different sending sources (consumers 660 and 670). Accordingly, the requests 821, 823, 825, and 827 are determined to be target requests as a result of performing target request determining processing in step S103. Then, in delay amount determination processing (step S105), delay amounts for the target requests are determined. However, since the requests 821, 823, 825, and 827 are the final requests for the associated identical chunks in their reception orders, the delay amounts are determined as 0, and items of data 822, 824, 826, and 828 are immediately sent.

Upon receiving the requests 805, 807, 809, and 811, the request statistics processing unit 603 of the publisher 600 performs request statistics processing (step S102) so as to generate entries for the corresponding chunks. At this time point, there is an entry for the previous chunk positioned prior to the chunks of the requests 805, 807, 809, and 811, and also, requests for the previous chunk have been received from a plurality of different sending sources (consumers 660 and 670). Accordingly, the requests 805, 807, 809, and 811 are determined to be target requests as a result of performing target request determining processing in step S103. Then, in delay amount determination processing (step S105), delay amounts for the target requests are determined. Since the requests 805, 807, 809, and 811 are the first requests for the associated identical chunks in their reception orders, delays 841, 842, 843, and 844 are respectively applied to processing for sending items of data 806, 808, 810, and 812 in response to the requests 805, 807, 809, and 811. With the application of delay, the reception of the items of data 806, 808, 810, and 812 by the consumer 660 in response to the requests 805, 807, 809, and 811 is delayed, and a timing at which the consumer 660 sends a next request is also delayed. As a result, by performing the above-described operation, the time difference at which requests for the same chunk sent from the plurality of consumers 660 and 670 reach the relay node 300 or the publisher 600 is reduced.

As described above, among target requests for the same chunk sent from a plurality of consumers, sending of content data in response to a target request which reaches a publisher first is delayed. Meanwhile, a consumer encounters a delay in receiving data in response to a request, and it judges that network congestion has occurred. Then, in order to reduce the congestion, the consumer decreases the transmission rate for a series of subsequent requests or does not send a new request until a subsequent item of data is received.

By performing the above-described operation, the arrival of multiple requests for the same chunk at a relay node which relays a request to a publisher is localized on the time axis. This makes it possible to further promote the traffic aggregation by using a mechanism, such as a content storage device or a PIT, used in CCN, thereby reducing the traffic of the entire network. Additionally, the number of times a publisher has to send data in response to requests is decreased, thereby reducing the processing load on the publisher.

Embodiment 2 has been discussed in the context of CCN as an example. However, CONET, which has been discussed with reference to FIG. 12 in Embodiment 1, may be used.

Figure 17:
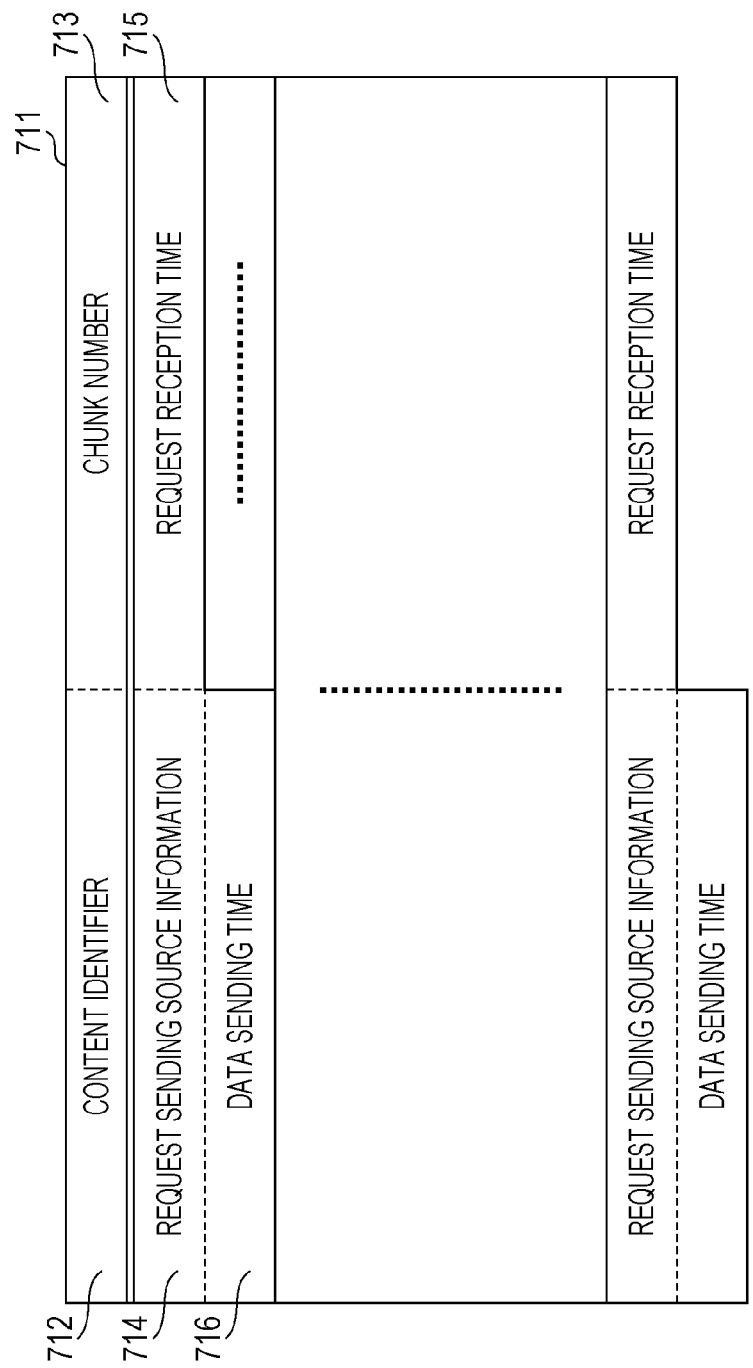
FIG. 17 illustrates an example of an entry generated for each chunk and stored in a request statistical table when CONET is utilized.

FIG. 17 illustrates an example of an entry 711 generated for a chunk and stored in the request statistical table 602 based on CONET.

As shown in FIG. 17, in the entry 711, a content identifier 712, a chunk number 713, request sending source information 714, a request reception time 715, and a data sending time 716 are stored. The entry 711 is generated for a chunk specified by the content identifier 712 and the chunk number 713, and retains therein at least one set of the request sending source information 714, the request reception time 715, and the data sending time 716 which form information concerning a request sent from a sending source. In the entry 711, plural sets of such items of information concerning requests sent from different sending sources may be stored. It is not always necessary to store the data sending time 716 in the entry 711.

In the content identifier 712, the network identifier 411 shown in FIG. 12, for example, is stored. In the chunk number 713, the chunk number 412 shown in FIG. 12, for example, is stored. In the request sending source information 714, information concerning a request sending source, for example, a MAC address, is stored. In the request reception time 715, a time at which a request was received is stored. In the data sending time 716, a time at which data was sent by the data processing unit 609 is stored.

In Embodiment 2, a description has been given of a case in which a plurality of consumers make a request for content data divided in units of chunks in order starting from the first chunk at the head of the content data. However, the present disclosure may be applicable to a case in which the requesting order of a plurality of items of content data is determined in advance or is predictable.

The present disclosure is suitably used in a data relay apparatus that relays a request and content data corresponding to a request and a server apparatus that sends content data in response to a request so as to implement more efficient data distribution by reducing the traffic of the entire network.

What is claimed is:

1. A data relay apparatus in information centric networking (ICN) comprising:

communication circuitry that receives, from a sending source, a request for a chunk divided from content data, the chunk being a predetermined unit of the content data, forwards the received request to a server, receives, from the server, the chunk of the content data in response to the received request, and forwards the received chunk of the content data to the sending source;

a request statistical table that stores therein information concerning the received request in an entry generated for each chunk corresponding to each request; and control circuitry, which in operation:

for each chunk, records a reception time and sending source information concerning a received request as information in the entry generated in the request statistical table;

determines that the received request is a target request, by referring to the request statistical table, if the request statistical table includes an entry for a previous chunk of the content data, the previous chunk being an adjacent chunk of the chunk being requested in an arrangement order of chunks forming the content data, and if requests for the previous chunk of the content data have been received from a plurality of different sending sources for a predetermined time;

determines a delay amount for the received request if the received request is determined to be the target request;

forwards the received request without delay, if the received request is determined not to be the target request; and delays forwarding the received request for the delay amount, if the received request is determined to be the target request.

2. The data relay apparatus according to claim 1, further comprising a storage device that temporarily stores the received chunk, wherein the control circuitry does not forward the received request if the chunk corresponding to the received request is stored in the storage device, and the control circuitry forwards the chunk stored in the storage device in response to the received request if the chunk corresponding to the received request is stored in the storage device, wherein the control circuitry delays forwarding the chunk stored in the storage device for the delay amount.

3. The data relay apparatus according to claim 1, wherein the control circuitry deletes an entry generated for a chunk for a previously received request in the request statistical table if a new request for a chunk is not received for a predetermined time interval or longer.

4. The data relay apparatus according to claim 1, wherein the control circuitry identifies the previous chunk by using a time stamp or a sequence number included in a name described in the received request.

5. The data relay apparatus according to claim 1, wherein the control circuitry identifies the previous chunk by using a content identifier and a chunk number included in a name described in the received request.

6. The data relay apparatus according to claim 1, wherein the control circuitry determines the delay amount based on at least one of:

an order of arrival of received requests for a same chunk, the requests for the same chunk being transmitted from the plurality of different sending sources;
a time difference between reception times of the received requests for the same chunk;
a time or a number of requests received for the previous chunk;
a time from which a received request is forwarded until a chunk corresponding to the received request is arrived or a time from which a previous request corresponding to the previous chunk is forwarded until the previous chunk corresponding to the previous request is arrived;
a processing load on the data relay apparatus;
traffic sent and received by the data relay apparatus; and
a type of content data or application.

7. A server apparatus in information centric networking (ICN) comprising:
communication circuitry that receives, from a sending source, a request for a chunk divided from content data, the chunk being a predetermined unit of the content data, and sends chunk of the content data in response to the received request to the sending source;
a request statistical table that stores therein information concerning the received request in an entry generated for each chunk corresponding to each request; and
control circuitry, which in operation:
for each chunk, records a reception time and sending source information concerning a received request as information in the entry generated in the request statistical table;
determines that the received request is a target request, by referring to the request statistical table,
if the request statistical table includes an entry for a previous chunk of the content data, the previous chunk being an adjacent chunk of the chunk being requested in an arrangement order of chunks forming the content data, and
if requests for the previous chunk of the content data have been received from a plurality of different sending sources for a predetermined time;
determines a delay amount for the received request if the received request is determined to be the target request;
sends the chunk of the content data without delay, if the received request is determined not to be the target request; and
delays sending the chunk of the content data in response to the received request for the delay amount, if the received request is determined to be the target request.

8. The server apparatus according to claim 7, wherein the control circuitry deletes an entry generated for a chunk in the request statistical table if a new request is not received for the chunk of the entry for a predetermined time interval or longer.

9. The server apparatus according to claim 7, wherein the control circuitry identifies the previous chunk by using a time stamp or a sequence number included in a name described in the received request.

10. The server apparatus according to claim 7, wherein the control circuitry identifies the previous chunk by using a content identifier and a chunk number included in a name described in the received request.

11. The server apparatus according to claim 7, wherein the control circuitry determines the delay amount based on at least one of:

an order of arrival of received requests for a same chunk, the requests for the same chunk being transmitted from the plurality of different sending sources;
a time difference between reception times of the received requests for the same chunk;
a time or a number of requests received for the previous chunk;
a processing load on the server apparatus;
traffic sent and received by the server apparatus; and
a type of content data or application.

12. A data relay method in information centric networking (ICN), the method comprising:
receiving, from a sending source, a request for a chunk divided from content data, the chunk being a predetermined unit of the content data;
recording a reception time and sending source information as information concerning a received request in an entry generated for each chunk of each request in a request statistical table in which the information concerning the received request is stored;
determining that the received request is a target request, by referring to the request statistical table,
if the request statistical table includes an entry for the previous chunk of the content data, the previous chunk being an adjacent chunk of the chunk being requested in an arrangement order of chunks forming the content data, and
if requests for the previous chunk of the content data have been received from a plurality of different sending sources for a predetermined time;
determining a delay amount for the received request if the received request is determined to be the target request;
forwarding the received request or the chunk of the content data without delay, if the received request is determined not to be the target request; and
delaying forwarding the received request or the chunk of the content data received as a result of forwarding the received request from a server for the determined delay amount, if the received request is determined to be the target request.

13. A data sending method in information centric networking (ICN), the method comprising:
receiving, from a sending source, a request for a chunk divided from content data, the chunk being a predetermined unit of the content data;
sending the chunk of the content data in response to the received request to the sending source;
recording a reception time and sending source information as information concerning a received request in an entry generated for each chunk corresponding to each request in a request statistical table in which the information concerning the received request is stored;
determining that the received request is a target request, by referring to the request statistical table,
if the request statistical table includes an entry for the previous chunk of the content data, the previous chunk being an adjacent chunk of the chunk being requested in an arrangement order of chunks forming the content data, and
if requests for the previous chunk of the content data have been received from a plurality of different sending sources for a predetermined time;
determining a delay amount for the received request if the received request is determined to be the target request;
sending the chunk of the content data without delay, if the received request is determined not to be the target request; and delaying sending the chunk of the content data in response to the received request for the determined delay amount, if the received request is determined to be the target request.

* * * * *